(No Model.)
P. K. ALBRIGHT.
HAND SLED.
No. 594,925. Patented Dec. 7, 1897.
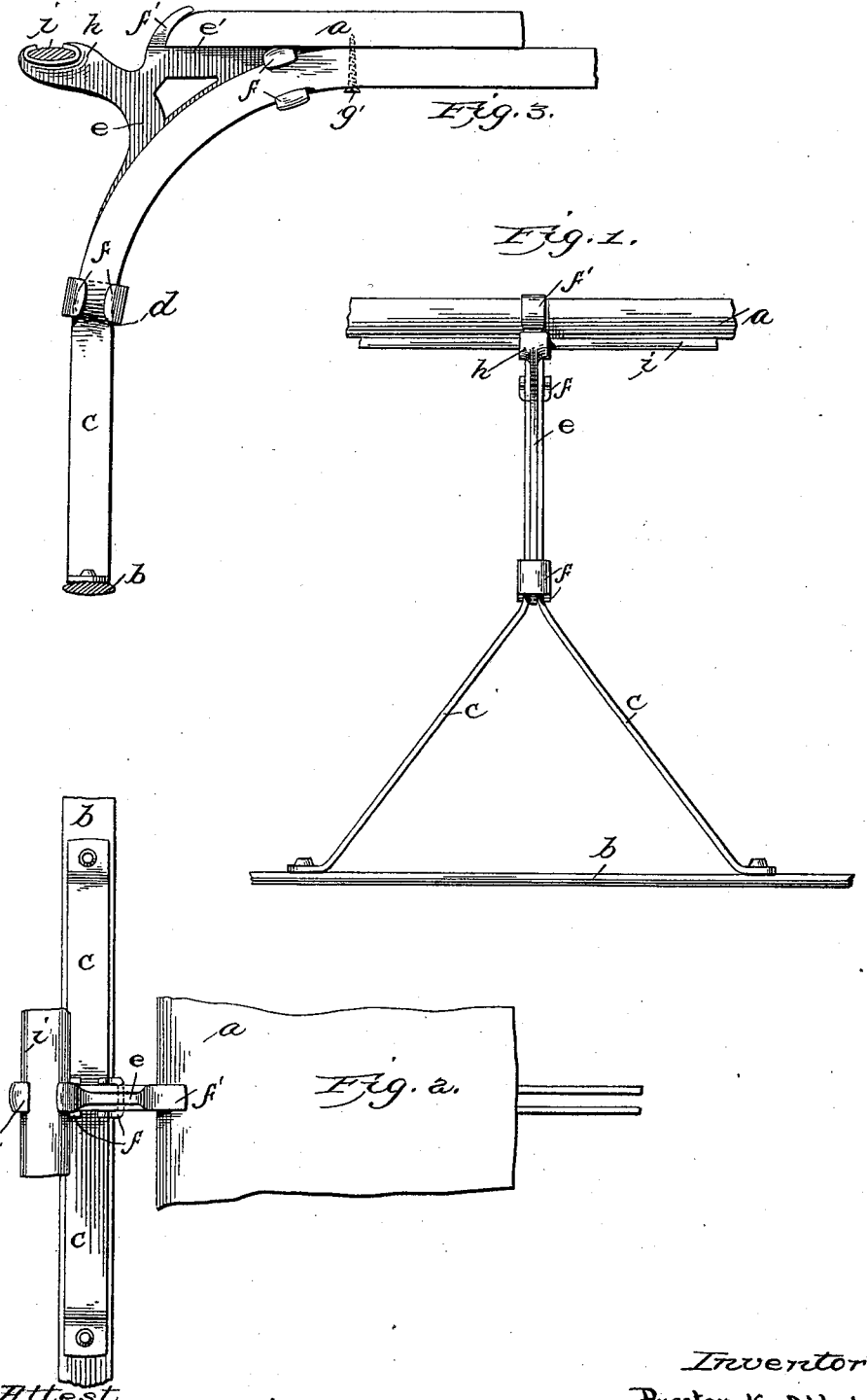
Inventor
Preston K. Albright.
by James F. Pettit,
Atty.
Attest
Wm Emory Pettit
Addie C. Pettit.

UNITED STATES PATENT OFFICE.

PRESTON K. ALBRIGHT, OF BINGHAMTON, NEW YORK.

HAND-SLED.

SPECIFICATION forming part of Letters Patent No. 594,925, dated December 7, 1897.

Application filed August 9, 1897. Serial No. 647,649. (No model.)

*To all whom it may concern:*

Be it known that I, PRESTON K. ALBRIGHT, a citizen of the United States, residing at Binghamton, in the county of Broome and State of New York, have invented a new Improvement in Hand-Sleds; and I do declare the following to be a full, clear, and exact description of the same, reference being had to the accompanying drawings, forming a part thereof.

My invention relates to hand-sleds; and its object is to provide a very simple construction of the knee, together with means connected therewith for holding the top board of the sled in place and serving also as a support for the rave.

In the drawings, Figure 1 is an elevation of a part of the frame of a sled, showing my invention. Fig. 2 is a plan view of the same part, and Fig. 3 is a view from one side.

The bottom board of the sled is shown at $a$, and the runner at $b$. Connected to the runner and extending therefrom is a sled-knee composed of two flat metal strips $c$, the ends of these strips diverging to where they join the runner, to which they may be riveted, and from the point $d$ they curve upwardly to a horizontal plane and are arranged parallel to each other. Intermediate of this strip is a clamping-bracket $e$, being provided at each end with lugs $f$ of T shape on each side, and these lugs engage the knee-strips and thus securely clamp the strips and bracket together, the part of the bracket located between the strips adding to the strength of the structure.

The bracket $e$ has an extension $e'$ on a level with the horizontal part of the sled-frame, and from this extension a lug projects upwardly, as shown at $f'$, and the top of the sled is adapted to be supported at its edges by the extension $e'$ and to be partially held by the lugs $f'$. To further secure the top in place, a bolt or screw $g'$ may be passed through between the parallel strips of the knee, so as to enter the top of the sled from the under side thereof. The clamp-bracket has a still further extension or projection $h$, adapted to support the rave $i$, and this rave fits into a recess in the extension $h$, and in order to secure the rave in place the edges of the extension forming the recess are bent inwardly, so as to clamp the rave.

What I claim is—

1. In a sled, a knee comprising two parallel strips having diverging lower ends engaging the runner, a clamping-bracket located between said strips and clamping the same together, said bracket having a support for the sled-top and a support for the rave, substantially as described.

2. In combination with the sled-knee, a bracket secured thereto, said bracket supporting the rave and having a lug engaging the top of the sled, substantially as described.

3. In a sled, parallel knee-strips, a clamping-bracket between them supporting the rave and the top of the sled and securing means for the top of the sled extending between the knee-strips, substantially as described.

PRESTON K. ALBRIGHT.

Witnesses:
WM. EMORY PETTIT,
ADDIE C. PETTIT.